Feb. 20, 1962 A. KOLFLAT 3,022,238
SAFETY DEVICE FOR AND METHOD OF PROTECTING NUCLEAR POWER PLANTS
Filed May 23, 1957 3 Sheets-Sheet 1

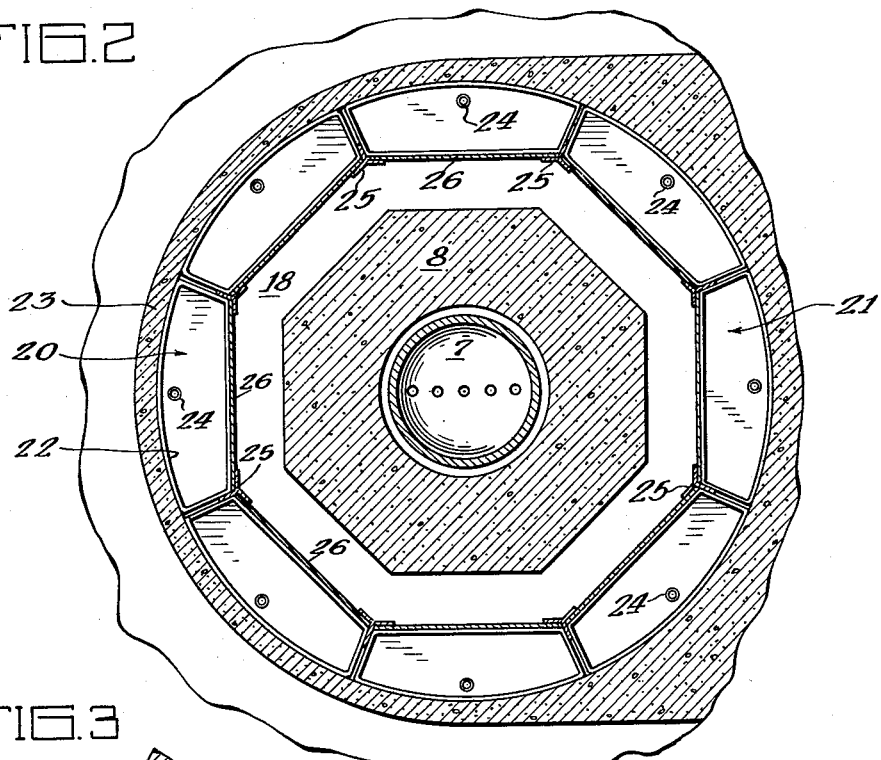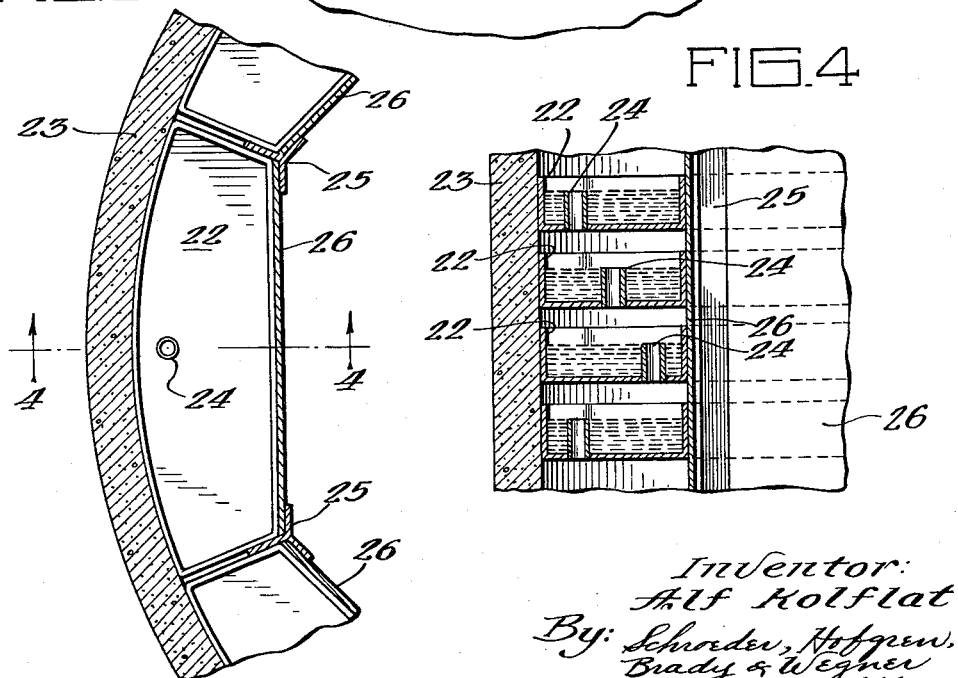

Inventor:
Alf Kolflat
By: Schroeder, Hofgren,
Brady & Wegner
Attorneys

Feb. 20, 1962   A. KOLFLAT   3,022,238
SAFETY DEVICE FOR AND METHOD OF PROTECTING NUCLEAR POWER PLANTS
Filed May 23, 1957   3 Sheets-Sheet 3

Inventor:
Alf Kolflat
By: Schroeder, Hofgren,
Brady & Wegner
Attorneys

United States Patent Office 3,022,238
Patented Feb. 20, 1962

3,022,238
SAFETY DEVICE FOR AND METHOD OF PROTECTING NUCLEAR POWER PLANTS
Alf Kolflat, Wilmette, Ill.
(140 S. Dearborn St., Chicago 3, Ill.)
Filed May 23, 1957, Ser. No. 661,229
3 Claims. (Cl. 204—193.2)

This invention has to do with a safety device for a nuclear reactor power plant and a method of protecting such a power plant from causing pressure rise within a containment vessel in the event of an accidental rupture of the reactor.

In the past, containment vessels for nuclear power plants have been designed on the theory that they should be strong enough to retain all heat that might be released in the event of an accident. The assumption has been that the heat would be primarily in the form of steam and that some fission products would also have to be retained by the containment vessel. The shells of the vessels have, as a result of the assumptions made in their design, been quite thick plate structures made in accordance with pressure vessel codes. Welded steel shells of pressure vessels generally must be X-rayed and sometimes stress relieved. The initial cost of the heavy plate as well as the forming and erection has contributed to the extremely high cost of such containment vessels.

It is the primary purpose of this invention to provide means by which the expensive containment vessels for nuclear power plants may be eliminated. This may be done if the possibility of pressure rise within the containment vessel is completely eliminated. The present invention accomplishes this purpose.

It is a further object of the invention to provide a method of protecting the power plant of a nuclear reactor in such a way that no pressure rise will occur within the containment vessel or housing even though the reactor may accidently rupture.

Another object is to provide heat absorbing material about a reactor so located as to absorb heat released and at a sufficiently rapid rate to avoid any pressure rise within the containment vessel for the reactor.

Figure 1:
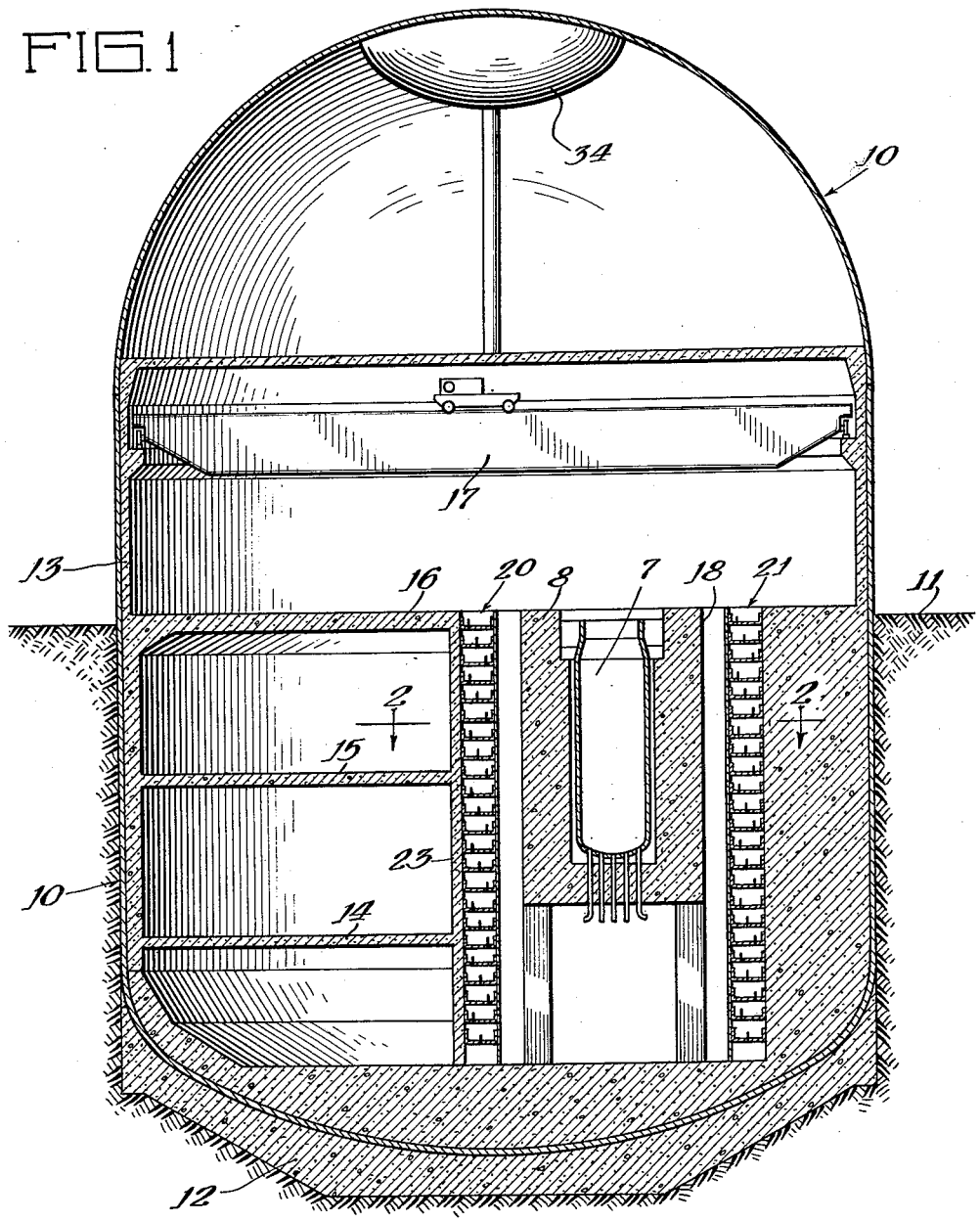
Figure 5:
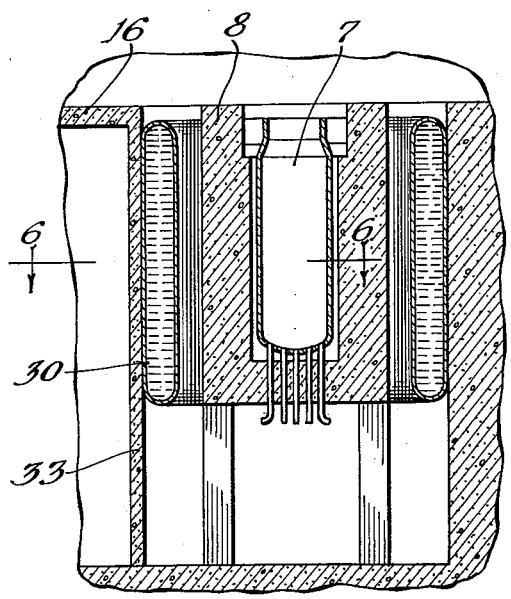
Figure 6:
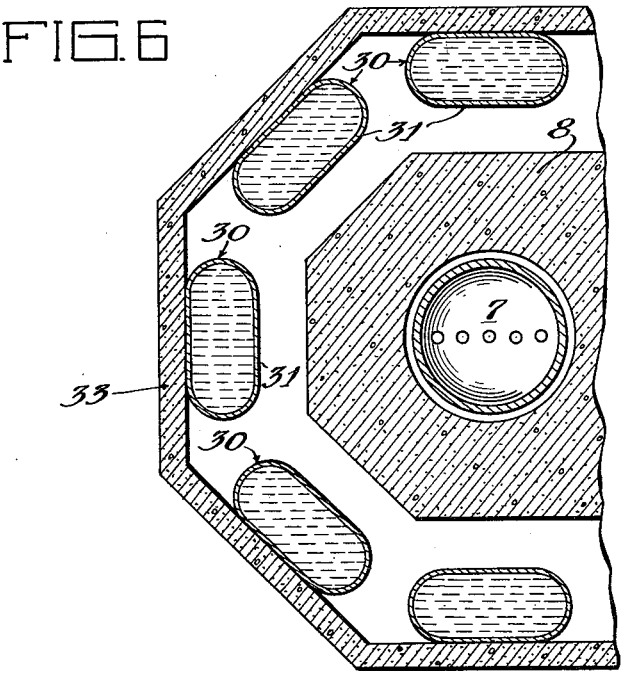

Other objects, features and advantages of the present invention will be apparent from the following description of embodiments of the invention illustrated in the accompanying drawings, in which:

FIGURE 1 is a partially diagrammatic, elevational sectional view through a nuclear power plant and its containment vessel having the invention therein, FIGURE 2 is a fragmentary enlarged sectional view through the reactor taken substantially along line 2—2 in FIGURE 1, FIGURE 3 is a fragmentary enlarged plan view partly in section of a part of the safety device, FIGURE 4 is a fragmentary sectional view of a portion of the safety device taken substantially along line 4—4 in FIGURE 3, FIGURE 5 is a fragmentary sectional view through a modified form of the safety device showing a reactor similar to that of FIGURE 1, and FIGURE 6 is a fragmentary plan sectional view through the reactor of FIGURE 5 taken substantially along line 6—6 therein.

FIGURE 1 of the drawings shows somewhat diagrammatically an upright section through an experimental boiling water reactor. The reactor 7 is shown as encased in concrete 8 extending around the reactor itself, the reactor and other parts of the mechanism (not shown) being housed within a containment vessel 10. The nuclear fuel in the reactor heats water to produce useable steam. The vessel 10 is a pressure vessel formed of steel plate, fabricated in sections and welded together at the construction site. The vessel 10 houses the reactor, turbine, condenser, necessary pumps and some controls for operating the power plant. The essential differences between the nuclear reactor type of power plant and power plants of other known designs is primarily in the type of fuel and necessary appurtenances for handling and using the fuel. As further illustrated in FIGURE 1, the containment vessel 10 extends below ground level 11 and rests upon a concrete foundation pad 12 as well as having a concrete lining 13 throughout most of its extent. Various floors, such as 14, 15 and 16, are formed within the vessel for the support of the condensers, pumps, controls, etc. The movable crane 17 is shown diagrammatically for handling the equipment within the vessel.

Very little actual experience is available concerning the temperature and pressure rises which might occur within a containment vessel should there be an accidental rupture of the reactor. Very few nuclear power plants are in operation and as far as is known, accidents have been avoided. For this reason, certain assumptions have been made in the design of the containment vessels. One of these assumptions has been that the vessel should retain all heat released or that which could be released from the reactor. This heat would ordinarily be in the form of steam since the reactors may generally be expected to contain pressurized water at from 600 pounds per square inch to 800 pounds per square inch or higher and the quantity as well as the heat energy content of the water would be known. Additionally, the shell should be designed to retain a quantity of heat which might be released because of the presence of the products of fission.

Tests conducted in smaller tanks have indicated that time is an important factor in the pressure and temperature rise which might occur within the containment vessel should the reactor rupture. The maximum pressure and temperature might be expected within a period of from 1 to 10 seconds following such rupture. Such tests have also indicated that the maximum pressure which could be expected from the total energy available for release would not be as high as expected because of absorption within the material of the shell and in any other material within the shell. The intent of the present invention is to provide a means for avoiding entirely any pressure rise within the containment vessel. Briefly stated, this is accomplished by absorbing all of the heat that may be released upon the happening of an incident.

In the present invention, a mass of heat absorbing material is provided within the vessel containing the reactor, so arranged that it may absorb substantially all heat that may be released upon reactor rupture. Referring particularly to FIGURE 1, it will be noted that a walk-way space 18 is provided around the reactor casing 8 and that tiers of water filled trays, such as 20 and 21, are arranged around the walkway space. The time during which the heat absorbing material may be effective is greatly limited since the maximum pressure may occur within very few seconds following reactor rupture. It is therefore desirable that the heat absorbing material be placed as close as is practicable to the reactor itself.

As may be noted in FIGURES 1-4, individual trays 22 are mounted within a concrete or steel retaining wall 23 which, if made of concrete, is reinforced with metal rods so as to give it strength to withstand some explosive force. The trays 22 are arranged in vertical tiers and circumferentially spaced close together to provide an encircling ring of trays about the reactor within the retaining wall 23. Each tray is provided with an overflow pipe 24 having its upper edge slightly below the upper edge of the tray so that an entire tier may be filled from the uppermost level. The trays are generally formed of metal which is a heat absorbing material in itself. The water may be obtained from any available source and generally will have a temperature somewhere within the range of about 40° F. to 70° F. Over a sufficiently long period of storage, the water may be expected to be at room temperature.

The amount of metal trays and water is chosen to provide sufficient heat exchange with the steam and products of fission which might be released to prevent a pressure rise within the containment vessel. The heat exchange rate will be rapid since the structure provides for direct contact between steam released and the water filled trays. An important feature of the present invention is the placement of the heat absorbing material in a location such that heat exchange may begin practically at the instant of reactor rupture. It is therefore preferable to locate the material close to the reactor as shown.

It is preferable from the standpoint of evaporation and cleanliness, to maintain the trays enclosed. Thus, the trays may be supported on the wall 23 and upstanding column supports 25 between which are light-weight enclosing panels 26 of Transite or the like easily frangible by the explosion of an incident. The particular shape of the trays may be chosen as desired, the ones in FIGURES 1 and 2 being shaped to fit together inside the retaining wall 23.

It is important that the heat absorbing material be close to the reactor and be exposed for direct heat exchange which may occur at a very rapid rate. It is possible to provide the water in an enclosure which will disintegrate with the explosion of reactor rupture. In FIGURES 5 and 6, water is housed within closed tanks 30 which have a light-weight wall 30 facing the reactor enclosure 8 so that any explosion will rupture the tanks releasing the water therein. The tanks need not be filled leaving space in the top for breathing. While FIGURE 5 shows the tanks extending over the entire height of the reactor, a series of vertically spaced tanks may be substituted should it be desirable to keep the head pressure in the tanks low. It is preferable that the tanks be mounted within a wall 33 which may help to keep the force of the explosion confined to the area of the reactor. The wall 33 illustrated is given a polygonal shape in plan, however, may be constructed cylindrical as in FIGURE 2, if desired. Given sufficient time, just a matter of a few seconds, the relatively cold water stored around the reactor will absorb all heat released. Some of the heat also will be absorbed in the metal trays or tanks. From the foregoing, it will be appreciated that reactor containment vessels need not be pressure vessels but could simply be housings for the power plants, with the use of the present invention. The quantity of heat absorbing material should be sufficient to absorb all possible heat energy that may be released without permitting a substantial pressure rise within the containment vessel. The vessel illustrated in FIGURE 1 is equipped with an elevated water storage tank 34 in its uppermost part connected with a sprinkler system which may be used to reduce pressure within the vessel should a maximum superatmospheric pressure be reached. This tank and sprinkler system may now be most useful to wash down walls and equipment and thus help to reduce the reactor particles which might have lodged after the explosion.

The foregoing detailed description has been given for clearness of understanding only and no unnecessary limitations should be understood therefrom, for some modifications will be obvious to those skilled in the art.

I claim:
1. A nuclear power plant heat absorber comprising in combination: a building-size containment vessel housing for the power plant, a boiling water reactor supported within the containment vessel for heating water directed to the reactor, a retaining wall inside said containment vessel and extending about the reactor in spaced relation thereto leaving an air space between the wall and reactor, said retaining wall surrounding said reactor in relatively close proximity to the reactor, a plurality of trays supported on the side of said retaining wall facing said reactor, water at ambient temperature substantially filling said trays, said trays being closely spaced and in number to contain a large volume of ambient temperature water sufficient to absorb substantially the entire quantity of heat present within said heated water directed to the reactor so as to prevent a pressure rise within the containment vessel in the event of an accidental rapid release and escape of said heated water from the reactor, said trays being positioned around the reactor for immediate direct contact between said ambient temperature water in the trays and said heated water upon such accidental release from the reactor.

2. A nuclear power plant heat absorber comprising in combination: a building-size containment vessel housing for the power plant, a boiling water reactor supported within the containment vessel for heating water directed to the reactor, a retaining wall inside said containment vessel and extending about the reactor in spaced relation thereto leaving an air space between the wall and reactor, said retaining wall surrounding said reactor in relatively close proximity to the reactor, a plurality of upright tanks supported on the side of said retaining wall facing said reactor, water at ambient temperature substantially filling said tanks, said tanks being generally large and in number to contain a large volume of ambient temperature water sufficient to absorb substantially the entire quantity of heat present within the heated water directed to the reactor so as to prevent a pressure rise within the containment vessel in the event of an accidental rapid release and escape of said heated water from the reactor, said tanks being easily frangible by force of rapidly escaping hot water from the reactor and positioned around the reactor for immediate direct contact between said ambient temperature water in the tanks and said heated water upon such accidental release from the reactor.

3. A nuclear power plant heat absorber comprising in combination: a building-size containment vessel housing for the power plant; a boiling water reactor supported within the containment vessel, said reactor being capable of heating a quantity of water directed to the reactor; a retaining wall inside said containment vessel and extending around the reactor in spaced relation thereto; and fluid-tight, readily frangible wall sections spaced inwardly from said retaining wall and surrounding the reactor in relatively close proximity thereto so as to leave an air space between the wall sections and reactor, said wall sections being adapted to confine a sufficient volume of ambient temperature water about the reactor to substantially absorb and dissipate the entire quantity of heat present within the heated water directed to the reactor without raising the ambient temperature water beyond its boiling point so as to prevent a pressure rise within the containment vessel in the event of an accidental rapid release and escape of said heated water from the reactor.

References Cited in the file of this patent

UNITED STATES PATENTS

| | | |
|---|---|---|
| 2,743,225 | Ohlinger et al. | Apr. 24, 1956 |
| 2,811,487 | Stanton | Oct. 29, 1957 |
| 2,816,068 | Ruano | Dec. 10, 1957 |
| 2,850,447 | Ohlinger et al. | Sept. 2, 1958 |

OTHER REFERENCES

Andersen: International Conference on the Peaceful Uses of Atomic Energy, United Nations, New York, vol. 2 (1955), pages 91–96.

Power, vol. 99 (No. 9, September 1955), pages 75–81. Copy in Scientific Library (TA 1 P8) and 204–193.3.

Kolflat and Chittenden: "A New Approach to the Design of Containment Shells for Atomic Power Plants," prepared for presentation at 19th Annular American Power Conference, Sherman Hotel, March 27–29, 1957.

Additional pages of previously cited reference made of record: Conference on Peaceful Uses of Atomic Energy, vol. 3, pages 259–260.